Figure 1:
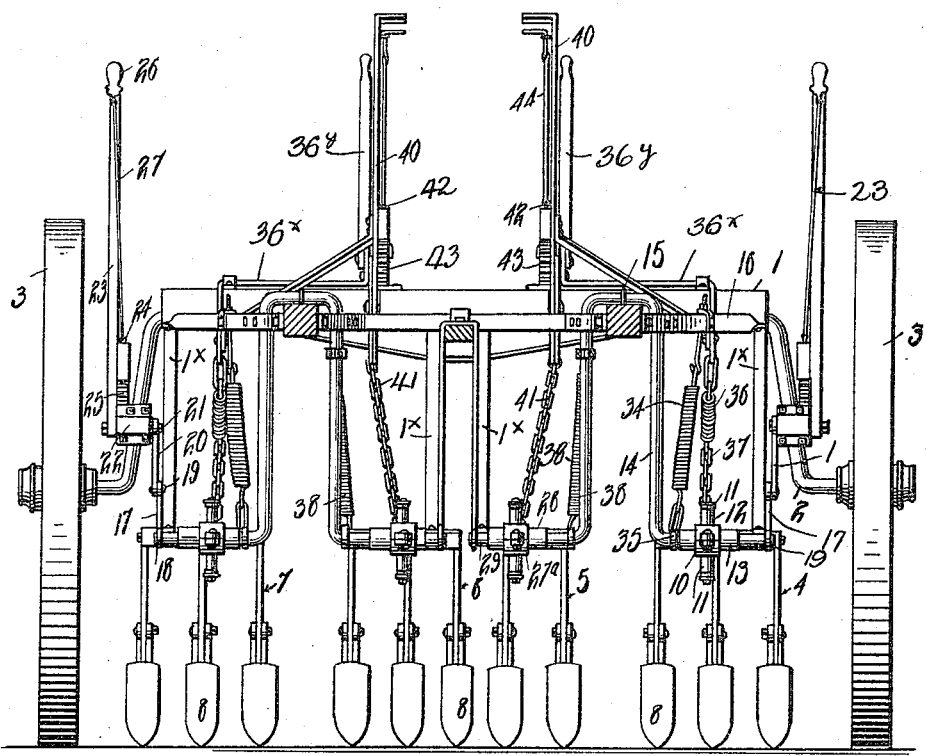

I. B. HOXWORTH.
GANG CULTIVATOR.
APPLICATION FILED MAR. 23, 1914.

1,182,766.

Patented May 9, 1916.
2 SHEETS—SHEET 1.

Witnesses

Inventor
I.B. Hoxworth,
By Franklin H. Hoyt
Attorney

I. B. HOXWORTH.
GANG CULTIVATOR.
APPLICATION FILED MAR. 23, 1914.
1,182,766.
Patented May 9, 1916.
2 SHEETS—SHEET 2.
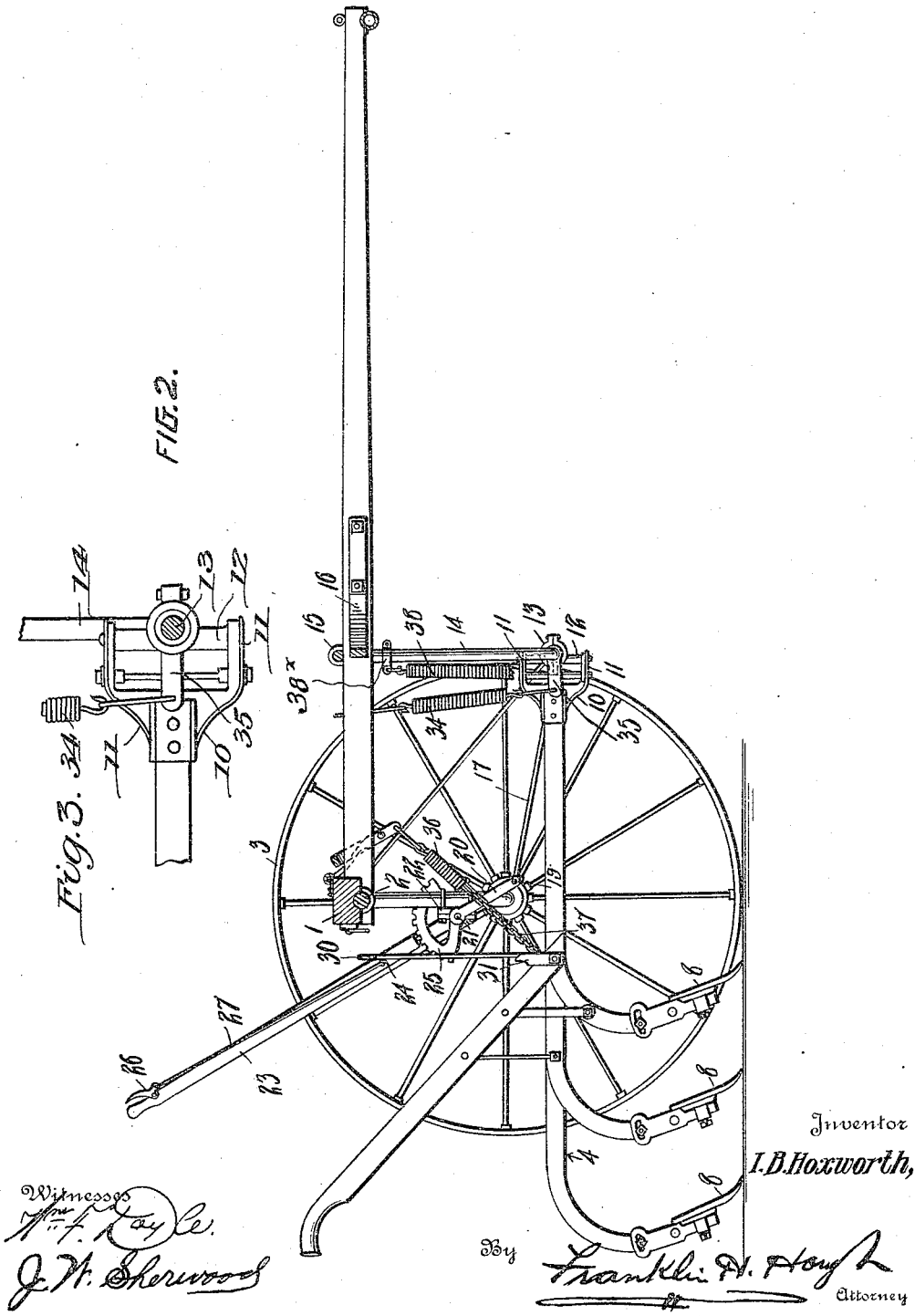

UNITED STATES PATENT OFFICE.

ISRAEL B. HOXWORTH, OF WASHINGTON, IOWA.

GANG-CULTIVATOR.

1,182,766.

Specification of Letters Patent.

Patented May 9, 1916.

Application filed March 23, 1914. Serial No. 826,680.

*To all whom it may concern:*

Be it known that I, ISRAEL B. HOXWORTH, a citizen of the United States, residing at Washington, in the county of Washington and State of Iowa, have invented certain new and useful Improvements in Gang-Cultivators; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in riding or walking cultivators and comprises a simple and efficient apparatus of this nature having various details of construction, combinations and arrangements of parts which will be hereinafter fully described, shown in the accompanying drawings and then specifically defined in the appended claim.

My invention is illustrated in the accompanying drawings, in which:—

Figure 1 is a front view of the apparatus, the tongues of the frame being shown in section. Fig. 2 is a vertical sectional view through a part of the frame, the operative parts of the apparatus being shown in side elevation, and Fig. 3 is a detail sectional view of a part of the invention.

Reference now being had to the details of the drawings by numerals, 1 designates a cross bar in which the drop axles 2 are journaled and adapted to rock and each has a wheel 3 journaled upon the outer crank end of an axle section. In the drawings I have shown four gang frames, designated respectively by numerals 4, 5, 6 and 7 and each carrying the cultivator plows 8. The beams of the gang frame 7 are fastened at their forward ends to couplings 10 and 11 which in turn are connected to the member 12 which projects from a sleeve 13 which is journaled upon a horizontally disposed portion of the yoke 14, which latter is fastened by means of staples 15 to the tongue 16. The beams of the gang frame 4 are similarly connected to a yoke 14 which is fastened also to the tongue, as shown clearly in Fig. 1 of the drawing. A rod 17 has an eye 18 at one end engaging a crank end of the yoke 14 and its other end is pivotally connected through the medium of the pin 19 with a crank arm 20 which in turn is fixed to the rock shaft 21 journaled in bearings 22 which is fastened to the drop axle 2. A lever, designated by numeral 23, is fastened to the shaft 21 and carries a palw 24 for engagement with the teeth of the segment member 25 and a hand lever 26 is pivotally connected by means of a lever 27 with said pawl and forming a convenient means whereby the latter may be raised out of the notches in the segment when it is desired to swing the lever for the purpose of causing the drop axle to swing in its bearings and cause the frame and the gangs to raise and lower, it being understood that the yokes 14 are held rigidly when the drop axles swing in their bearings. The gangs 5 and 6, which are of identical construction, have bracket arms $27^b$, which are similar to the bracket arms 10 and 11, and are secured to the sleeves $27^a$ mounted upon a collar 28 on the inner ends of the yokes 14, as shown in Fig. 2 of the drawings.

Adjustable spreaders, designated by numeral 30, each has its outer end fastened to a bar 31, which latter are fastened to the gangs 4 and 7 and each of said spreaders has series of apertures 32 through which bolts 33 are adapted to be passed for the purpose of adjusting the said spreaders to hold the same different distances apart, accordingly as it may be desired to adapt the cultivators for different widths of spaces between the rows of corn or other plants to be cultivated.

Coiled springs 34 are fastened at their upper ends to the frame, as shown in the drawings, and their lower ends are connected to cranks 35 which are fixed to sleeves 13 upon the crank end of the yoke 14. The purpose of said springs, there being one connected to each sleeve upon a yoke 14, is to tend to cause the sleeves to rock and assist in throwing the beams upward after having been lowered for the purpose of causing the cultivators upon the beams to cut deeper into the soil. Other springs, designated by numeral 36, are fastened to the crank ends of the shaft $36^x$, which has an upright handle $36^y$, and their lower ends are connected to chains 37 which are fastened to the frames of the outer gangs 4 and 7. Other springs, designated by numerals 38, are fastened at their lower ends to said bracket arms $27^b$, which connect the beams of the gangs 5 and 6 with the yokes. The upper ends of the springs 38 are secured to the upright parts of the yoke.

Levers 40, of identical construction, are pivotally mounted upon the frame of the cultivator and each has connected at its lower end the chain 41 which in turn is fastened one to each of the gang frames 5 and 6. Suitable spring-pressed pawls 42 are mounted upon each lever 40, adapted to engage the teeth of the segments 43 and each pawl is operated by a hand lever 44, being convenient to the operator who, if he rides upon the apparatus, is adapted to sit upon the seat 45 which is suitably mounted upon the frame, thus affording means whereby the seat may be thrown forward to the position shown in the drawings when it is desired to utilize the apparatus as a walking cultivator, as shown in dotted lines in Fig. 8. Stirrups, designated by numeral 47, are formed upon the intermediate gang beams, forming means whereby the operator, when riding, may rest his feet therein. Suitable brace bars 1$^x$ are fastened at their forward ends to the yokes and their rear ends to the drop axle, thus securely holding the lower ends of the yokes rigid.

The operation of the apparatus will be readily understood and is as follows:—By the manipulation of one of the levers 40, one or the other of the gangs 5 or 6 may be raised or lowered. Should it be desired to operate either of the outer gangs, independent one of the other, it may be done by the manipulation of one of the handles or levers 36$^y$ which, through the medium of the crank shaft 36$^x$ and its connections with an end gang, will operate the end gang independent of the inner one. When it is desired to raise and lower one side or the other of the frame, it may be done through the medium of the levers 23 and the connections between the same and one of the drop axles. For instance, a forward swinging movement of the lever 23 will, by reason of the rigid connection between the same and the fixed yoke 14, cause the drop axle to turn toward an upright position and a reverse or rearward swinging movement of the lever will cause the drop axle to move rearward, thus corresponding in the two movements allowing the frame carrying the cultivators to be lowered or raised. By the adjustment of the spreaders which carry the gang frames, the distances between the gang plows may be adjusted accordingly as it may be desired to cultivate spaces of varying widths between the rows of corn or other plants.

By the provision of the springs, the gangs may be easily raised and allowing the same to be adjusted so that the gangs will be positioned so as to clear any corn and not breaking same down while the apparatus is passing over the field.

What I claim to be new is:—

A gang cultivator comprising a frame with tongues attached thereto, axles journaled upon the frame, a wheel journaled upon the outer end of each axle, stationary yokes secured to and depending from said tongues, sleeves journaled upon crank ends of the yokes, cultivator gang beams, bracket arms secured thereto and connected to said sleeves, an arm projecting from each sleeve and a spring connected at one end to the yoke and the other end to an arm of the sleeve, a crank shaft journaled upon the frame and having a handle, and a spring connecting one end of the crank shaft and said gang beams.

In testimony whereof I hereunto affix my signature in presence of two witnesses.

ISRAEL B. HOXWORTH.

Witnesses:
G. M. ZARING,
J. J. KELLOGG.

Copies of this patent may be obtained for five cents each, by addressing the "Commissioner of Patents, Washington, D. C."